G. A. RITZ.
RUNNER ATTACHMENT.
APPLICATION FILED JUNE 15, 1917.
1,251,423.
Patented Dec. 25, 1917.
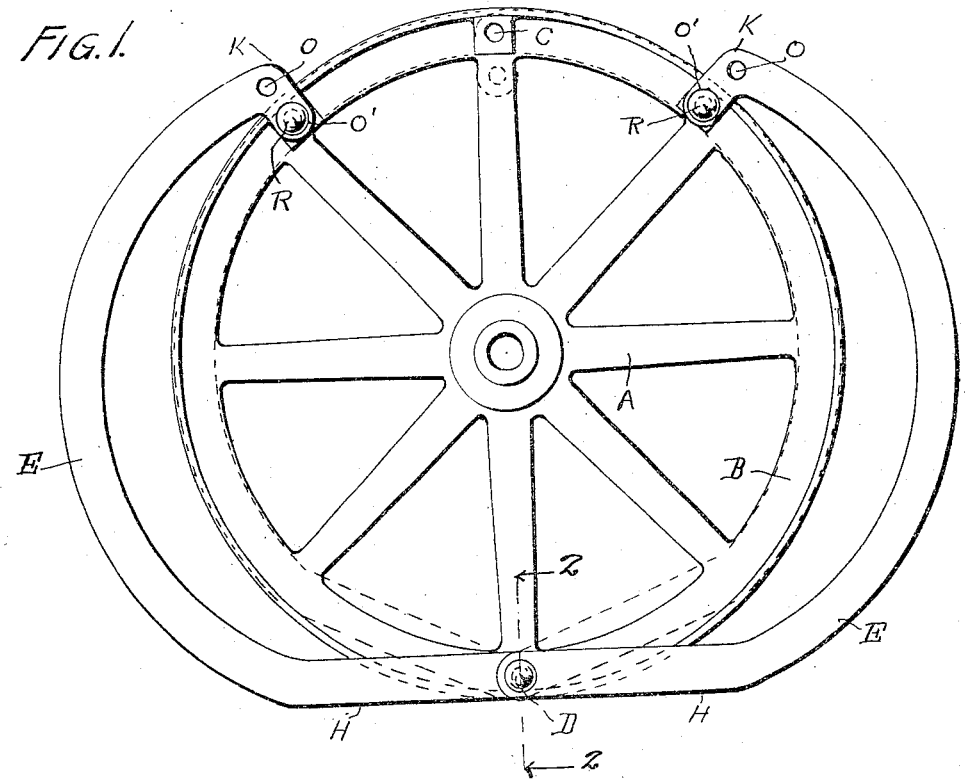
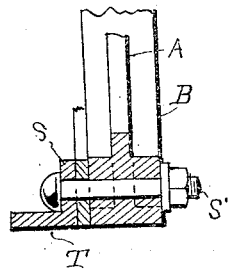
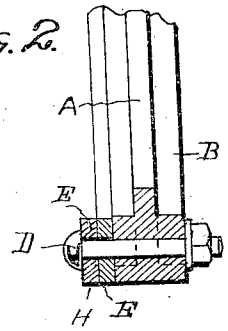
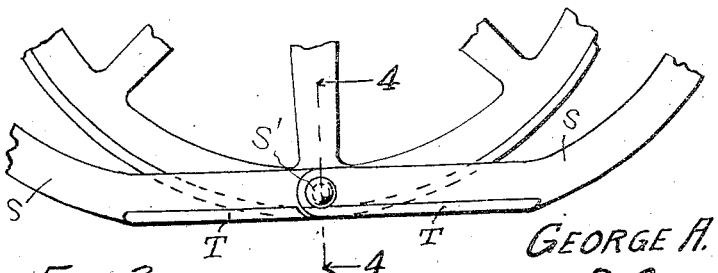
Inventor
GEORGE A. RITZ
By Franklin N. Hough
Attorney

UNITED STATES PATENT OFFICE.

GEORGE A. RITZ, OF ROCHESTER, NEW YORK.

RUNNER ATTACHMENT.

1,251,423.   Specification of Letters Patent.   Patented Dec. 25, 1917.

Application filed June 15, 1917.   Serial No. 174,870.

*To all whom it may concern:*

Be it known that I, GEORGE A. RITZ, a citizen of the United States, residing at Rochester, in the county of Monroe and State of New York, have invented certain new and useful Improvements in Runner Attachments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in runner attachments for wheels for various purposes and consists in the provision of a simple and efficient device which is adapted to be permanently held upon a wheel and so arranged that it may be conveniently adjusted to convert the wheel for use as a sleigh runner.

The invention comprises a simple and efficient device of this nature having various details of construction, combinations and arrangements of parts which will be hereinafter fully described, shown in the accompanying drawings and then specifically defined in the appended claims.

I illustrate my invention in the accompanying drawings, in which:—

Figure 1 is a side elevation of my invention.

Fig. 2 is a sectional view on line 2—2 of Fig. 1.

Fig. 3 is a detail view of a slight modification of the invention.

Fig. 4 is a sectional view on line 4—4 of Fig. 3.

Reference now being had to the details of the drawings by letter, A designates a wheel having a rim B in which are formed apertures C and D. Runner members E are pivotally mounted upon a bolt F passing through the aperture D, and said runner sections are provided with flat portions H, as shown in Fig. 1 of the drawings which, when adjusted for use, are held with the straight portions in alinement with each other. Each of said sections E is bent at an angle at K and has apertures, designated by letters O and O' therein, the apertures O' being adapted to receive the bolts R when the runners are held in adjusted positions shown in Fig. 1 of the drawings, thus securely fastening the runner braces to the wheel. When the runners are out of use, they may be swung to the position shown in dotted lines in Fig. 1 and, when in such positions, a bolt may be passed through the registering apertures K, C and K, thus holding the runners with their marginal edges inside the periphery of the wheel. When the runners are adjusted in these positions, the wheel may be used in the ordinary way without interference therefrom.

In Figs. 3 and 4 of the drawings, I have shown a slight modification of my invention in which the runner sections each has a laterally extending flange T, thus widening the contact surface of the runner, as plainly shown in Fig. 4 of the drawings. In the modified form, the two runner sections S and S' are of similar construction and are pivotally mounted upon the bolt $S^2$ and fastened to the wheel in the manner shown in Fig. 1.

By the provision of a runner attachment for wheels as shown and described, it will be noted that the wheel may be easily and quickly converted for use as a sleigh runner, by simply shifting the positions of the runners in order that the straight edges of the two runners will come in alinement with each other and be positioned flush with the lowest part of the wheel.

What I claim to be new is:—

1. A wheel having sled runners permanently and adjustably mounted thereon.

2. In combination with a wheel, sled runners having two of the adjacent ends pivotally connected to the felly of the wheel and their other ends adjustably held to different parts of the felly of the wheel.

3. In combination with a wheel having a felly with apertures therein, sled runners having two of their adjacent ends pivoted together and to the felly of the wheel, portions of the runners adjacent to their meeting ends being straight and adapted to be held, when in operative positions, in alinement with each other.

4. In combination with a wheel having a felly with apertures therein, sled runners having two of their adjacent ends pivoted together and to the felly of the wheel, portions of the runners adjacent to their meeting ends being straight and adapted to be held, when in operative positions, in alinement with each other, the other ends of the runners bent at angles and apertured, and bolts for adjustably holding the same in adjusted positions upon the felly.

In testimony whereof I hereunto affix my signature in presence of two witnesses.

GEORGE A. RITZ.

Witnesses:
WILLIAM H. AKRUHEAD,
LUTHER S. LAKE.